United States Patent
Kraglund et al.

(10) Patent No.: US 8,634,393 B2
(45) Date of Patent: Jan. 21, 2014

(54) CHANNEL SCANNING IN A NETWORK HAVING ONE OR MORE ACCESS POINTS

(75) Inventors: Flemming Kraglund, Frederiksberg (DK); Siddhartha Dattagupta, Irvine, CA (US)

(73) Assignee: Cisco Technology, Inc., San Jose, CA (US)

( * ) Notice: Subject to any disclaimer, the term of this patent is extended or adjusted under 35 U.S.C. 154(b) by 159 days.

(21) Appl. No.: 13/204,469

(22) Filed: Aug. 5, 2011

(65) Prior Publication Data

US 2013/0033995 A1 Feb. 7, 2013

(51) Int. Cl.
- *H04W 4/00* (2009.01)
- *H04J 1/00* (2006.01)
- *H04W 72/02* (2009.01)
- *H04B 7/12* (2006.01)
- *H04B 7/208* (2006.01)

(52) U.S. Cl.
USPC .......... 370/338; 370/343; 370/437; 455/63.1; 455/450; 455/509

(58) Field of Classification Search
None
See application file for complete search history.

(56) References Cited

U.S. PATENT DOCUMENTS

| | | | |
|---|---|---|---|
| 2010/0120437 A1* | 5/2010 | Foster et al. | 455/444 |
| 2011/0216692 A1* | 9/2011 | Lundsgaard et al. | 370/328 |
| 2011/0267977 A1* | 11/2011 | Doppler et al. | 370/254 |
| 2012/0039238 A1* | 2/2012 | Li | 370/315 |
| 2012/0225619 A1* | 9/2012 | Charland | 455/1 |
| 2012/0252446 A1* | 10/2012 | Reial et al. | 455/434 |
| 2013/0005240 A1* | 1/2013 | Novak et al. | 455/11.1 |

* cited by examiner

Primary Examiner — Alpus H Hsu
Assistant Examiner — Walter Divito
(74) *Attorney, Agent, or Firm* — Patterson & Sheridan, LLP

(57) ABSTRACT

Techniques are presented for channel scanning in a network having one or more access points. In one embodiment, a first frequency band is scanned to identify a first access point. A channel indicator is received from the first access point. A second frequency band is scanned based on the channel indicator, to identify a second access point. The second access point may be identified based on the channel indicator.

17 Claims, 10 Drawing Sheets

500

BEGIN

SCAN A FIRST FREQUENCY BAND TO IDENTIFY A FIRST
WIRELESS ACCESS POINT (WAP), WHERE THE FIRST FREQUENCY
BAND IS DIVIDED INTO A FIRST PLURALITY OF CHANNELS, AND
WHERE THE FIRST WAP PROVIDES ACCESS TO A NETWORK
VIA A FIRST CHANNEL OF THE FIRST PLURALITY OF CHANNELS ~510

RECEIVE A MESSAGE FROM THE FIRST WAP, THE MESSAGE
SPECIFYING A SECOND CHANNEL VIA WHICH THE NETWORK
IS ACCESSABLE, WHERE THE SECOND CHANNEL IS SELECTED
FROM A SECOND PLURALITY OF CHANNELS OF A SECOND
FREQUENCY BAND THAT IS DIFFERENT FROM THE FIRST
FREQUENCY BAND ~520

SCAN THE SPECIFIED SECOND CHANNEL TO IDENTIFY A
SECOND WAP PROVIDING ACCESS TO THE NETWORK VIA
THE SECOND FREQUENCY BAND, WITHOUT HAVING TO SCAN
ANY OF THE SECOND PLURALITY OF CHANNELS OTHER THAN
THE SPECIFIED SECOND CHANNEL ~530

SEND AN ASSOCIATION REQUEST TO THE SECOND WAP
TO JOIN THE NETWORK VIA THE SECOND FREQUENCY BAND ~540

END

FIG. 5

CHANNEL SCANNING IN A NETWORK HAVING ONE OR MORE ACCESS POINTS

TECHNICAL FIELD

Embodiments presented in this disclosure generally relate to techniques for channel scanning in a wireless network and, more particularly, to techniques for channel scanning in a network having one or more access points.

BACKGROUND

Wireless networks are telecommunications networks that use radio waves to carry information from one node in the network to one or more receiving nodes in the network. Wired communication can also be used in portions of a wireless network, such as between cells or access points. Many wireless protocols have been developed, including WiFi, an implementation of various IEEE 802.11 protocols; Worldwide Interoperability for Microwave Access (WiMAX), an implementation of IEEE 802.16; and High Performance Radio Metropolitan Area Network (HiperMAN), which is based on an ETSI alternative to IEEE 802.16.

Wireless communication technologies are used in connection with many applications, including, for example, satellite communications systems, portable digital assistants (PDAs), laptop computers, and mobile devices (e.g., cellular telephones). One benefit that users of such applications can obtain is the ability to connect to a network (e.g., the Internet) as long as the user is within range of such wireless communication technologies.

BRIEF DESCRIPTION OF THE DRAWINGS

So that the manner in which the features embodiments presented in this disclosure can be understood in detail, a more particular description may be had by reference to example embodiments, some of which are illustrated in the appended drawings. It is to be noted, however, that the appended drawings illustrate only example embodiments and are therefore not to be considered limiting of its scope.

FIG. 5 is a flowchart depicting a method for channel scanning in a network having multiple wireless access points, according to an example embodiment presented in this disclosure.

DESCRIPTION

Overview

Figure 1A:
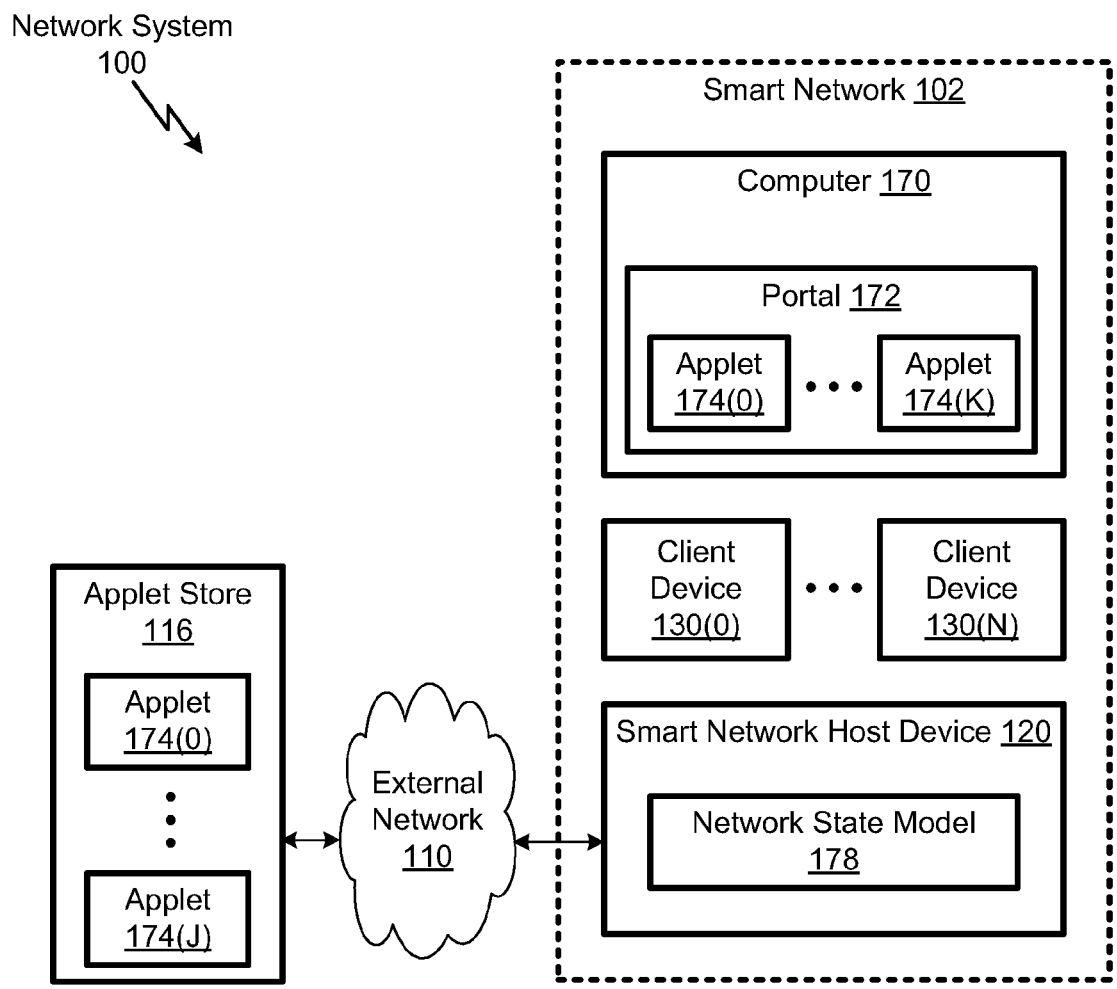
FIG. 1A is an exemplary illustration of an overarching network system configured to implement one or more embodiments presented in this disclosure.

Embodiments presented herein provide a method, logic encoded in one or more tangible media, and system for performing an operation that includes scanning a first frequency band to identify a first wireless access point (WAP). The first frequency band is divided into a first plurality of channels, and the first WAP provides access to a network via a first channel of the first plurality of channels. The operation also includes receiving a message from the first WAP, the message specifying at least a second channel via which the network is accessible. The second channel is selected from a second plurality of channels of a second frequency band. The operation also includes, responsive to the message, scanning the specified second channel to identify a second WAP providing access to the network via the second frequency band. The operation also includes sending an association request to the second WAP to join the network via the second frequency band.

Description of Example Embodiments

Embodiments presented in this disclosure provide techniques for channel scanning in a network having one or more wireless access points. The one or more wireless access points may provide connectivity to the network via multiple frequency bands. The frequency bands may each be divided into a respective plurality of channels. Further, each frequency band may have different performance characteristics. For example, in some embodiments, a first frequency band is a 2.4-gigahertz frequency band, and a second frequency band is a 5-gigahertz frequency band. In some cases, the 2.4-gigahertz frequency band may be associated with a signal range that is superior to that of the 5-gigahertz frequency band. Further, the 5-gigahertz frequency band may encounter less network interference than the 2.4-gigahertz frequency band. Accordingly, stations seeking to connect to the network may select a frequency band based on desired performance characteristics. A station or client device generally refers to a device capable of accessing a wireless network.

In one embodiment, a first access point may be configured provide connectivity to the network via a channel of the first frequency band. If the first access point supports concurrent, dual band operation, then the first access point may also provide connectivity to the network via a channel of the second frequency band. Additionally or alternatively, a second access point may provide connectivity via the channel of the second frequency band.

Suppose a station seeks to connect to the network via the second frequency band. To this end, the station may scan the first frequency band to identify the first access point. The station may receive a message from the first access point specifying a channel of a second frequency band via which the network may be accessed. The station may then scan the second channel to identify the first access point (or the second access point), without having to scan any other channel of the second frequency band. The station may then connect to the network via the second channel of the second frequency band.

In this way, the station may more efficiently connect to the network via the second frequency band, at least in some cases. In particular, the station may connect to the network via the provided second channel of the second frequency band without scanning the remaining channels of the second frequency band, thereby avoiding the time delay associated with scanning the remaining channels of the second frequency band. And although the first frequency band is scanned, incurring some delay, a net performance gain nevertheless results, especially in cases where the count of channels in the second frequency band exceeds the count of channels in the first frequency band. In some embodiments, the message specifies multiple channels of the second frequency band via which the network may be accessed (or may potentially be accessed). In such embodiments, the station may then scan the specified channels to identify an appropriate access point, without having to scan other (unspecified) channels of the second frequency band.

FIG. 1A is an exemplary illustration of an overarching network system 100 configured to implement one or more aspects presented in the disclosure. The network system 100 comprises a smart network 102, an external network 110, and an applet store 116. The external network 110 may comprise the well-known Internet or any other data network system. The smart network 102 includes a smart network host device 120 configured to transmit network data packets between the external network 110 and connected devices within the smart network 102, such as computer 170 and client devices 130. Any technically feasible wireless or wired physical transport technology may be implemented to transmit the network data packets. The smart network host device 120 maintains a network state model 178 that represents the different entities and related services operating within the smart network 102. For example, if client device 130(0) implements a printer with an integrated scanner and flash memory reader, then the network state model 178 would include an entry for client device 130(0), and related attributes for a printer service, scanner service, and file (or block device) service. New devices register with the smart network host device 120, which then updates the network state model 178 to include the new device.

A portal application 172, residing within the computer 170, is configured to access the network state model 178 to determine which client devices 130 are available within the smart network 102, which services the client devices 130 provide, and to access and use the services. The portal application 172 may include one or more applets 174, configured to extend functionality of the portal application 172. A given applet 174 may be associated with a specific client device 130 and may facilitate specific usage models for the client device 130 via the extended functionality. When a new client device 130 registers with the smart network 102, a most recent version of a corresponding applet 174 may not be available within the portal application 172. However, the portal application 172 may retrieve the corresponding applet 174 or version of the corresponding applet 174 from the applet store 116.

The applet store 116 is configured to facilitate access to applets 174 by the portal application 172. The applet store 116 provides storage for applets 174 corresponding to client devices 130 and makes the applets 174 available for download to the portal application 172 via the external network 110. In one embodiment, the applet store 116 occupies a well-known location, such as a universal resource locator (URL) associated with the external network 110. Any technically feasible technique may be used to identify a particular applet 174 as corresponding to a particular client device 130. Furthermore, any technically feasible technique may be used to download the particular applet 174 an incorporate the functionality of the applet 174 to the portal 172.

Figure 1B:
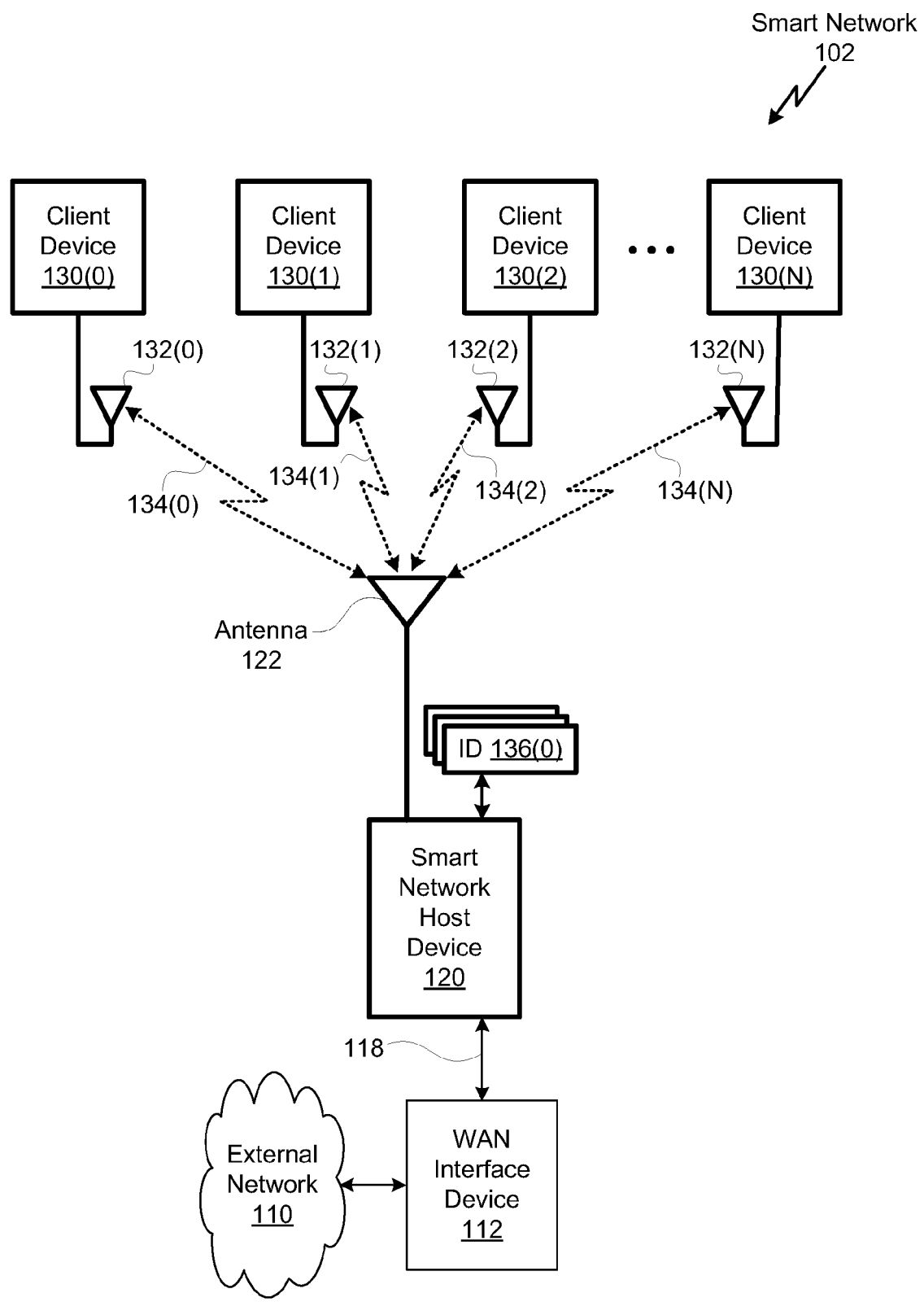
FIG. 1B illustrates the smart home network of FIG. 1A, according to one example embodiment presented in this disclosure.

FIG. 1B illustrates the smart home network 102 of FIG. 1A, according to one example embodiment. As shown, the smart network 102 comprises a smart network host device 120, one or more client devices 130, and a wide area network (WAN) interface device 112, coupled to the external network 110 of FIG. 1A. The WAN interface device 112 may implement a cable modem, digital subscriber line (DSL) modem, fiber to the home interface, or any other technically feasible device that provides digital network connectivity to the external network 110. The WAN interface device 112 is coupled to the smart network host device 120 via a network interface 118. In one embodiment, the network interface 118 implements the well-known Ethernet standard.

The smart network host device 120 implements a wireless network interface coupled to antenna 122, which is configured to convert electrical signals to electromagnetic signals for transmitting data packets, and electromagnetic signals to electrical signals for receiving data packets. The antenna 122 may comprise plural independent radiator structures, each having a separate radiation pattern for implementing spatial multiplexing. In one embodiment, the wireless network interface implements one or more well-known standards, such as the Institute of Electrical and Electronics Engineers (IEEE) standard 802.11, which defines a system for wireless local area networking. The antenna 122 is configured establish wireless client links 134 to antennas 132 coupled to corresponding client devices 130. The smart network host device 120 implements layer 2 forwarding (bridging) for wireless data packets forwarded among client devices 130 as well as internet protocol (IP) layer 3 routing between an IP domain associated with the smart network 102 and the external network 110. In this configuration, the smart network host device 120 provides related services and protocols, such as dynamic host configuration protocol (DHCP), network address translation (NAT), and the like.

The smart network host device 120 acts as a central authentication authority for the smart network 102 and implements authentication services for devices registering with the smart network 102. In one embodiment, authentication is implemented via Identification (ID) devices 136 that are uniquely paired with corresponding client devices 130. For example, client device 130(0) may be uniquely paired with ID device 136(0) by a manufacturer of the client device 130(0). An ID device 136(0) is physically presented to the smart network host device 120 as an authentication credential to allow a client device 130(0) paired to the ID device 136(0) to join the smart network 102. Furthermore, the client device 130(0) is able to authenticate the smart network 102 as a trusted network by accessing credentials for the corresponding ID device 136(0) specifically via the smart network 102. In one embodiment, the ID devices 136 are implemented as near field radio frequency identification (RFID) tags. Each one of the RFID tags is configured to retain authentication credentials necessary to uniquely associate the one RFID tag with one instance of the client device 130. In this way, an RFID tag may be paired with a given client device 130. Persons skilled in the art will recognize that any technique may be implemented to generate and represent authentication credentials without departing the scope and spirit of this disclosure. For example, in another embodiment, the ID devices 136 could be implemented as a physical token that includes a printed bar code on a face of the token. The bar code may encode authentication credentials for a corresponding client device 130. In such an embodiment, the smart network host device 120 may include an optical scanner capable of reading the printed bar code from the physical token. In alternative embodiments, other forms of ID devices 136 may implement storage of the authentication credentials. For example, a universal serial bus (USB) storage device may be used to present authentication credentials to the smart network host device 120 for authenticating a related device, such as the computer 170. In other alternative embodiments, a user may manually authenticate a client device 130 with the smart network host device 120. For example, the user may log onto a management web page generated by the smart network host device 120 and manually enter authentication credentials, such as a printed code associated with the client device 130.

In one usage scenario involving ID device 136, the user wishes to add a new device, such as a smart network-enabled printer to the smart network 102. The printer includes an ID device 136 implemented as an RFID tag that is paired to the printer. The user places the ID device 136 in close physical proximity to the smart network host device 120, which is the able to read the ID device 136 and authenticate the printer. The printer registers with the smart network host device 120 and is then available for use by devices connected within the smart network 102. Upon successfully reading the ID device 136, the smart network host device 120 may indicate success to the user by flashing a light-emitting diode (LED), or by generating any technically feasible indication.

Figure 1C:
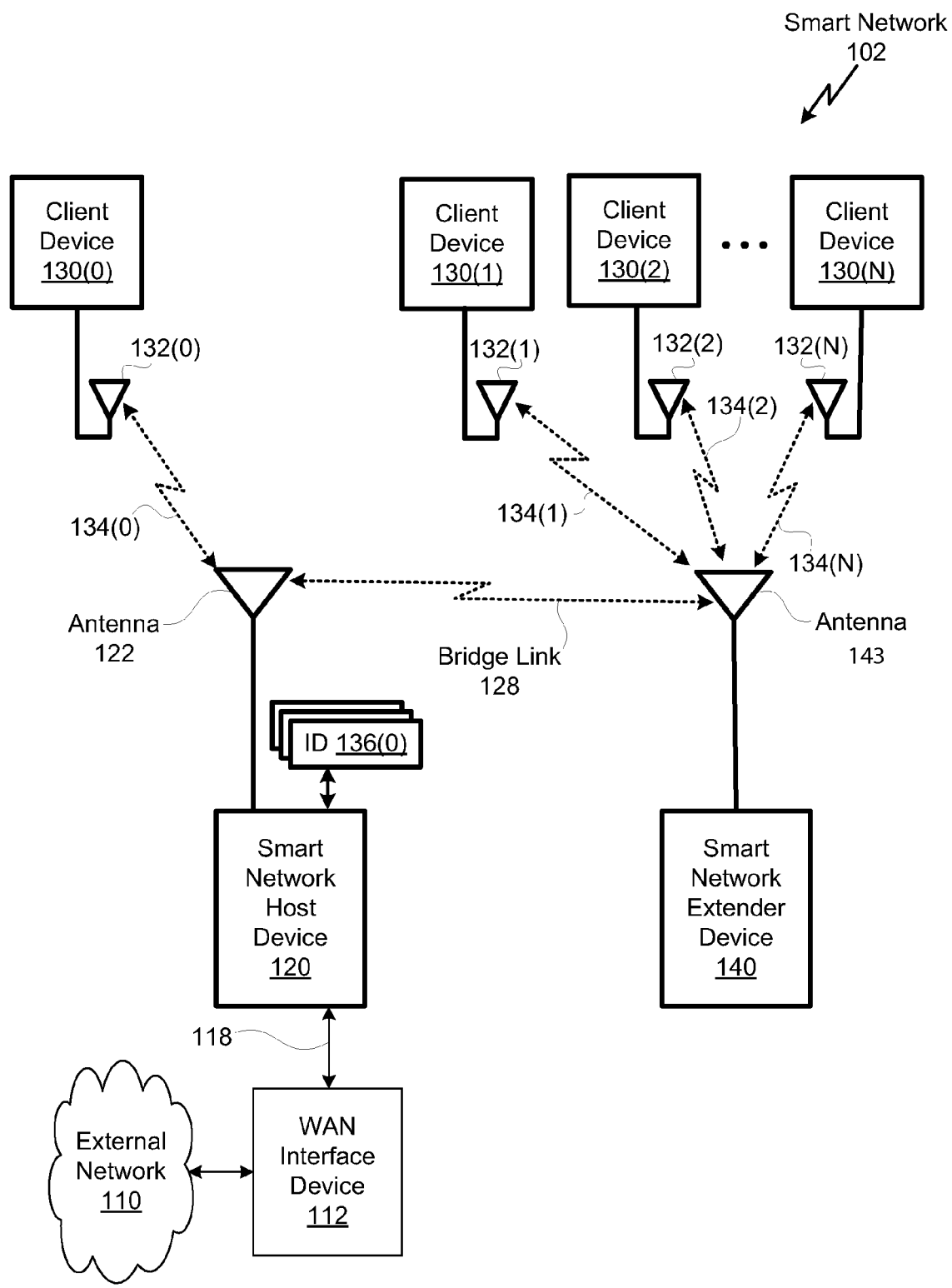
FIG. 1C illustrates the smart home network of FIG. 1A, according to another example embodiment presented in this disclosure.

FIG. 1C illustrates the smart home network 102 of FIG. 1A, according to another example embodiment. Here, the smart network 102 comprises a smart network host device 120, a smart network extender device 140, one or more client devices 130, and a wide area network (WAN) interface device 112, coupled to the external network 110 of FIG. 1A. The WAN interface device 112, smart network host device 120, and one or more client devices 130 are configured to operate as previously described in FIG. 1B.

In addition to previously described functionality, the smart network host device 120 is also configured to detect one or more smart network extender devices 140 and to establish a bridge link 128 to each of the one or more smart network extender devices 140. Each smart network extender device 140 is configured to act as a network bridge between a client device 130 and the smart network host device 120. For example, client devices 130(1) through 130(N) may be physically located such that they are able to connect to the smart network extender device 140, but not to the smart network host device 120. Furthermore, the smart network extender device 140 is able to connect to the smart network host device 120 via bridge link 128. Data packets transmitted by client devices 130(1) through 130(N) and destined to the external network 110 are received by the smart network extender device 140 and retransmitted by the smart network extender device 140 via bridge link 128 to the smart network host device 120, which then forwards the data packets to the external network 110. Similarly, data packets from the external network 110 that are destined to any of the client devices 130(1) through 130(N) are transmitted via bridge link 128 to the smart network extender device 140, which retransmits the data packets via wireless client links 134(1)-134(N). Persons skilled in the art will understand that wireless client links 134(1)-134(N) may each be configured to operate on a separate channel or band, or a common channel or band. Furthermore, bridge link 128 may operate on a separate channel or band with respect to the wireless client links 134.

In one embodiment, each smart network extender device 140 is paired to an ID device 136, which is presented as an authentication credential to the smart network host device 120 to enable the smart network extender device 140 to participate within the smart network 102.

Figure 1D:
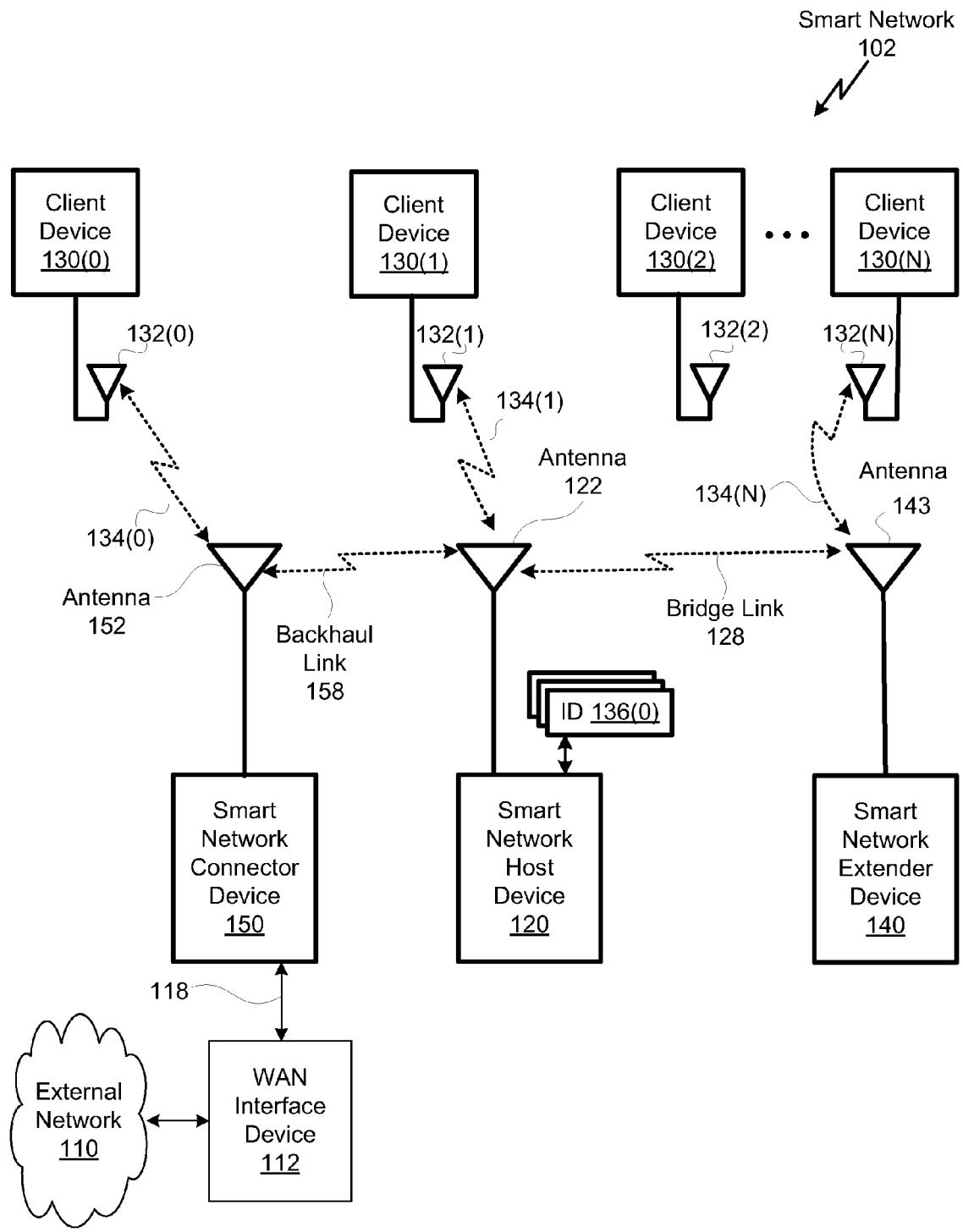
FIG. 1D illustrates the smart home network of FIG. 1A, according to yet another example embodiment presented in this disclosure.

FIG. 1D illustrates the smart home network 102 of FIG. 1A, according to yet another example embodiment. Here, the smart network 102 comprises a smart network host device 120, a smart network extender device 140, one or more client devices 130, a smart network connector device 150, and a wide area network (WAN) interface device 112, coupled to the external network 110 of FIG. 1A. The WAN interface device 112, smart network extender device 140, and one or more client devices 130 are configured to operate as previously described in FIGS. 1B and 1C.

In this embodiment, the smart network host device 120 is configured to operate similarly with respect to FIGS. 1B and 1C. However, upon detecting the smart network connector device 150, the smart network host device 120 is configured to operate as a bridge rather than a router, and the smart network connector device 150 is configured to operate as a router. A backhaul link 158 is established between the smart network host device 120 and the smart network connector device 150.

Network data traffic between client device 130(N) and the external network 110 traverses wireless client link 134(N), bridge link 128, and backhaul link 158. This network data traffic is also forwarded by smart network extender device 140, smart network host device 120, and smart network connector device 150. A client device 130 may connect directly to any one of the network extender device 140, smart network host device 120, or smart network connector device 150. As shown, client device 130(0) is connected to smart network connector device 150 via wireless client link 134(0), client device 130(1) is connected to smart network host device 120 via wireless client link 134(1), and client device 130(N) is connected to smart network extender device 140 via wireless client link 134(N).

In one embodiment, the smart network connector device 150 is paired to an ID device 136, which is presented as an authentication credential to the smart network host device 120 to enable the smart network connector device 150 to participate within the smart network 102. In an alternative embodiment, the smart network connector device 150 and the smart network host device 120 are paired during a manufacturing step, eliminating the need for a separate ID device 136.

Figure 1E:
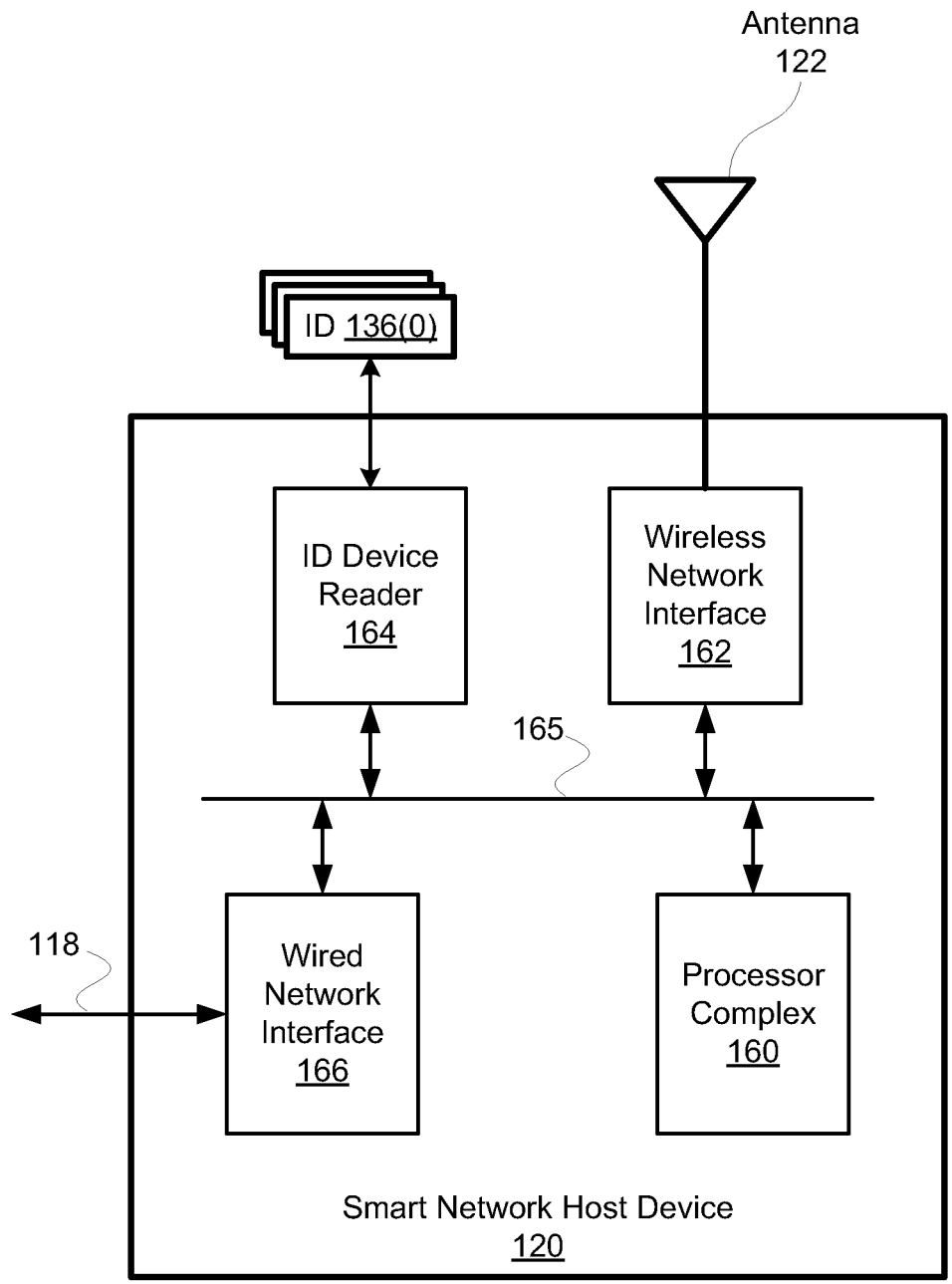
FIG. 1E is a more detailed illustration of the smart network host device of FIG. 1A, according to one example embodiment presented in this disclosure.

FIG. 1E is a more detailed illustration of the smart network host device 120 of FIG. 1A, according to one example embodiment. As shown, the smart network host device 120 comprises a processor complex, 160, a wireless network interface 162, an ID device reader 164, and a wired network interface 166. An interconnect 165 is configured to transmit data among the processor complex 160, wireless network interface 162, ID device reader 164, and wired network interface 166. The wired network interface 166 is configured transmit data packets via network interface 118, based on data received via the interconnect 165. The wired network interface 166 is also configured to receive data packets from the network interface 118 and transmit contents of the received data packets to the processor complex 160 via the interconnect 165. The wireless network interface 162 is configured to transmit data packets, based on data received via the interconnect 165, to one or more network devices within range. The wireless network interface 162 is also configured to receive data packets from the one or more network devices and then transmit contents of the received packets to the processor complex 160. The wireless network interface 162 is coupled to an antenna 122.

The processor complex 160 comprises a central processing unit (CPU), non-volatile memory for storing persistent programs, program state, and configuration information, random access memory (RAM) for storing temporary or volatile data, and an interface to the interconnect 165. In one embodiment, the processor complex 160 is configured to execute an operating system and applications that provide routing services. The routing services may include, for example, data packet forwarding between the network interface 118 and the wireless network interface 162. The packet forwarding services may include, without limitation, bridging among the one or more network devices via the wireless network interface 162.

The ID device reader 164 is configured to read data from an associated ID device 136. In one embodiment, the ID device reader 164 is configured to read data from RFID tags comprising the ID device 136. The ID device reader 164 may also include a USB reader. In another embodiment, the ID device reader 164 may be implemented as an optical scanner for reading ID devices 136 that encode data via a printed bar code. In yet other embodiments, the ID device reader 164 may be configured to read data from other types of interfaces, such as other types of flash memories like an SD flash card.

In certain embodiments, the smart network host device 120 comprises one or more integrated circuits that implement respective functions of the smart network host device 120. For example, the processor complex 160, wired network interface 166, and wireless network interface 162 may be integrated into a single integrated circuit.

Persons skilled in the art will recognize that the smart network extender device 140 may be implemented using the basic architecture of the smart network host device 120, with the exception that the ID device reader 164 and wired network interface 166 are not required for the smart network extender device 140. Similarly, the smart network connector device 150 may be implemented using the basic architecture of the smart network host device 120, with the exception that the ID device reader 164 is not required for the smart network connector device 150.

Figure 1F:
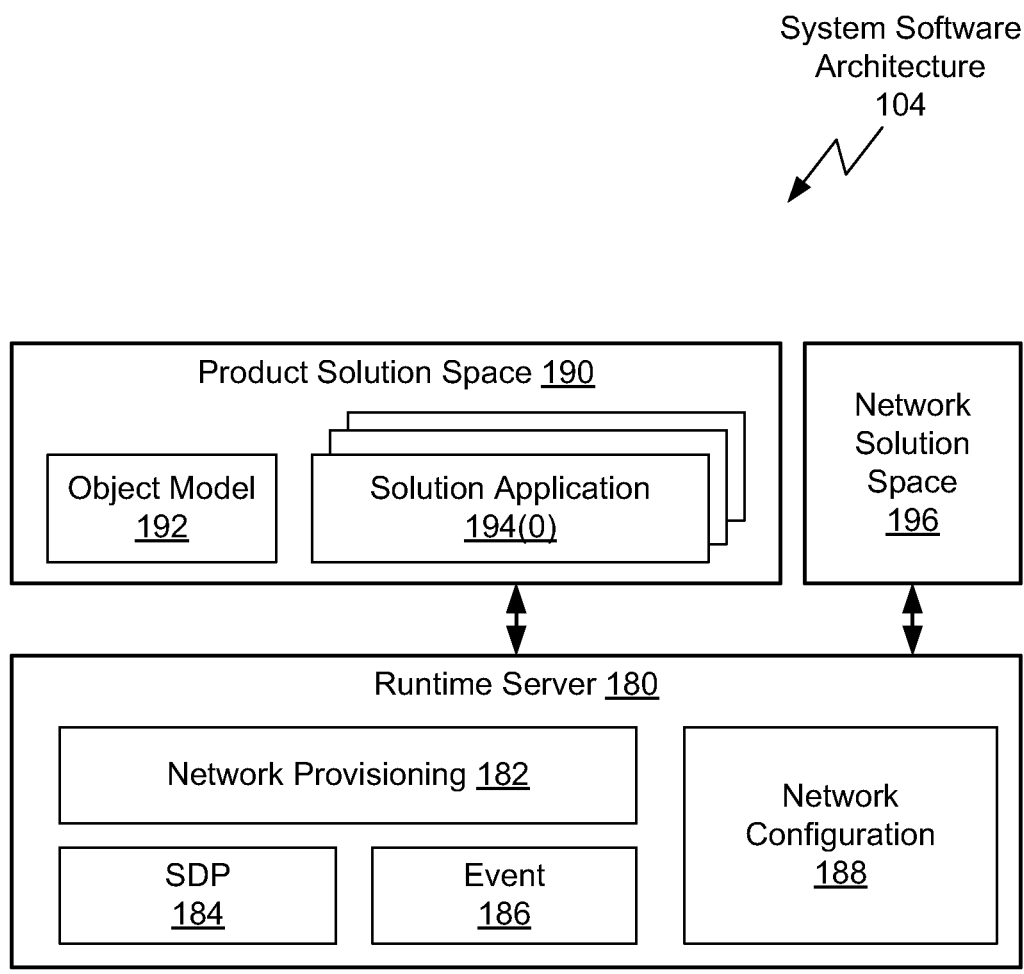
FIG. 1F illustrates a system software architecture for the smart network host device of FIG. 1E, according to one example embodiment presented in this disclosure.

FIG. 1F illustrates a system software architecture for the smart network host device of FIG. 1E, according to one example embodiment. As shown, the software architecture 104 includes several software modules within the smart network host device 120. Programming instructions stored within the processor complex 160 implement a portion of the system software architecture 104 that includes a runtime server 180, a product solution space 190, and a network solution space 196. The product solution space 190 comprises an object model 192 and one or more solution applications 194. The object model 192 provides a standard, consistent abstraction of different network elements and related services within the smart network 102. Exemplary network elements include devices coupled to the smart network 102, such as printers, cameras, and display devices. Exemplary services include device and service discovery, event tracking and generation, and state presentation for the different elements. In one embodiment, the object model 192 includes a network interface based on the well-known extensible markup language (XML). One or more solution applications 194 provide specific functionality, such as a specific view of a storage system, or a specific technique for presenting certain data. The network solution space 196 includes software modules configured to provide management of network elements and network services, including device services, local area network services within the smart network 102, and wide area network services related to connectivity management of the external network 110.

The runtime server 180 comprises a network provisioning module 182, a service and discovery provisioning (SDP) module 184, an event module 186, and a network configuration module 188. The event module 186 tracks different network events, such as a network device advertising presence or updating status within the smart network 102. The SDP module 184 maintains a persistent view of different network devices and related services, based on data from the event module 186 and on data from the network devices. The network provisioning module 182 provides authentication and authorization for network devices within the smart network 102. Authentication credentials may be presented via a given ID device 136. The network provisioning module 182 may also facilitate certain network services, such as DHCP leases. The network configuration module 188 includes hardware platform-specific implementation methods for network configuration and management. The persistent view comprises the network state model 178 of FIG. 1A.

Persons skilled in the art will recognize that the smart network connector device 150 and smart network extender device 140 may be implemented using an appropriate subset of the system software architecture 104 described above in conjunction with FIG. 1F.

Figure 2:
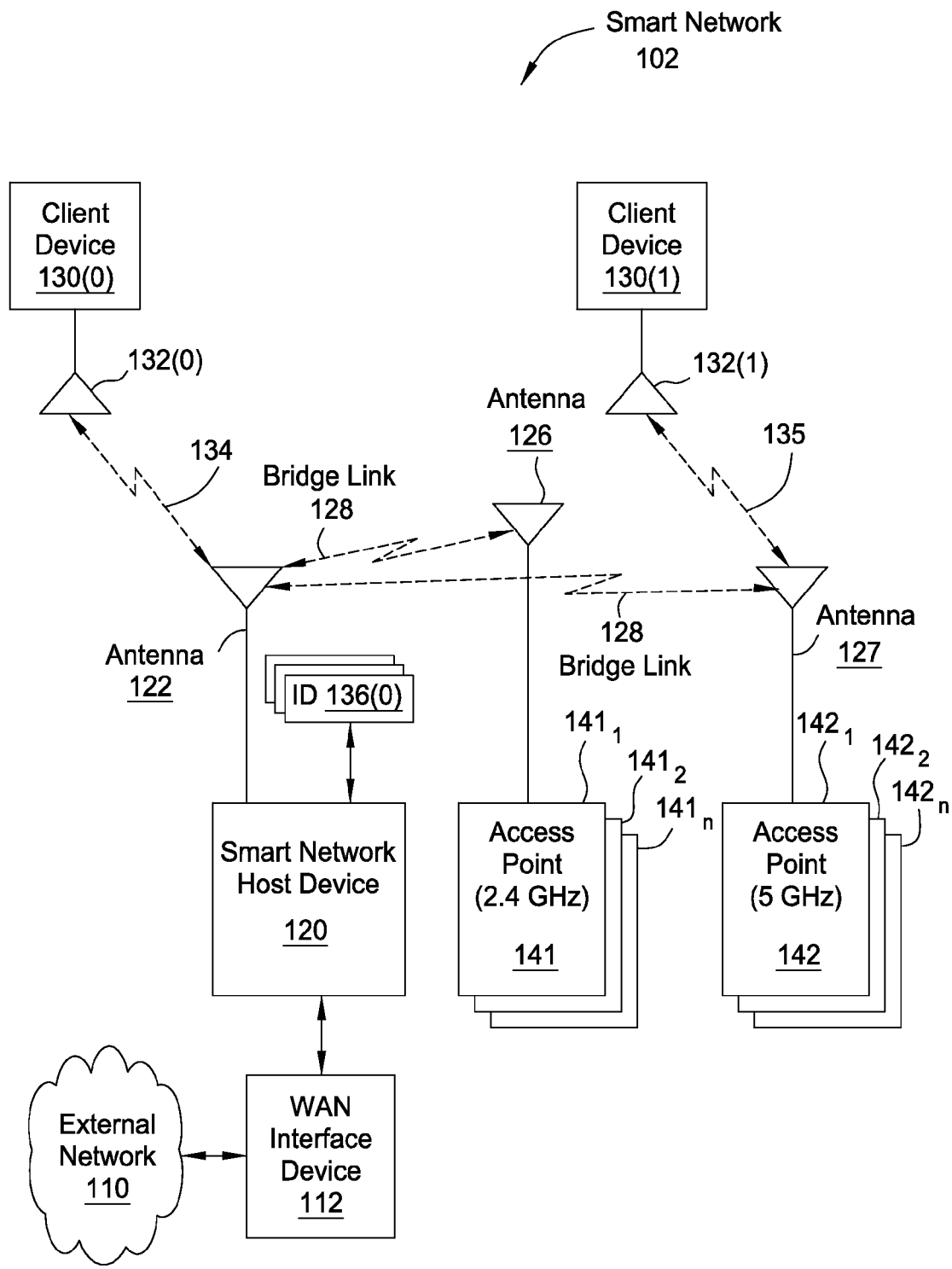
FIG. 2 illustrates the smart network of FIG. 1A, according to another example embodiment presented in this disclosure.

FIG. 2 illustrates the smart network of FIG. 1A, according to another example embodiment. Here, the smart network 102 includes the smart network host device 120, access points 141, 142, one or more client devices 130, and a wide area network (WAN) interface device 112, coupled to the external network 110 of FIG. 1A. The WAN interface device 112, smart network host device 120, and client devices 130(0) and 130(1) are configured to operate as previously described in FIG. 1A-1E.

In one embodiment, the access points 141, 142 each allow authenticated clients (e.g., client devices 130(0) and 130(1)) to access the smart network 102 over a respective wireless client link. An example of the wireless client link includes the wireless client link 135 between the client device 130(1) and the access point $142_1$. As shown, access points 141, 142 each include an antenna 126, 127 used to transmit and receive radio transmissions of network frames from client devices 130 and smart network host device 120. In this example, the access points 141, 142 have each established a bridge link 128 with the smart network host device 120. Network data transmitted by one of the client devices 130 destined for the external network 110 is received by one of the access points 141, 142 and retransmitted via bridge links 128 to the smart network host device 120. The smart network host device 120 then forwards the network data to the external network 110. Similarly, data packets from the external network 110 with a destination address of one of the client devices 130 are transmitted via bridge link 128 to the appropriate access point 141, 142, which retransmits the data packets via one of the wireless client links to the appropriate client device 130.

Depending on the embodiment, the smart network host device 120 may act as a registrar or wireless local area network (WLAN) manager for the client devices 130. The access points 141, 142 may communicate with the smart network host device 120 to determine whether the client devices 130 are authorized to access the smart network 102. If the device is authorized, then the access point allows that client device 130 to join the smart network 102 and may begin forwarding network frames to from the client device 130.

Suppose the client device 130(1) is seeking to join the smart network 102 via one of the access points 141, 142. Assume that, unbeknownst to the client device 130(1), the access points 141 operate in channel 6 of the 2.4-gigahertz frequency band, and the access points 142 operate in channel 60 of the 5-gigahertz frequency band. Assume also that the client device 130(1) includes wireless network interfaces for the 2.4-gigahertz and 5-gigahertz frequency bands, respectively. Suppose that the client device 130(1) prefers to access the smart network 102 via the 5-gigahertz frequency band rather than the 2.4-gigahertz frequency band, based on performance characteristics associated with the 5-gigahertz frequency band (e.g., reduced network interference). The client device 130(1) may scan one or more channels in the 5-gigahertz frequency band to select, from the access points 142, an access point with the highest signal strength. Using the techniques disclosed herein, the client device 130(1) and/or the smart network 102 may be configured such as to minimize or reduce scanning performed by the client device 130(1) in the 5-gigahertz frequency band.

Figure 3A:
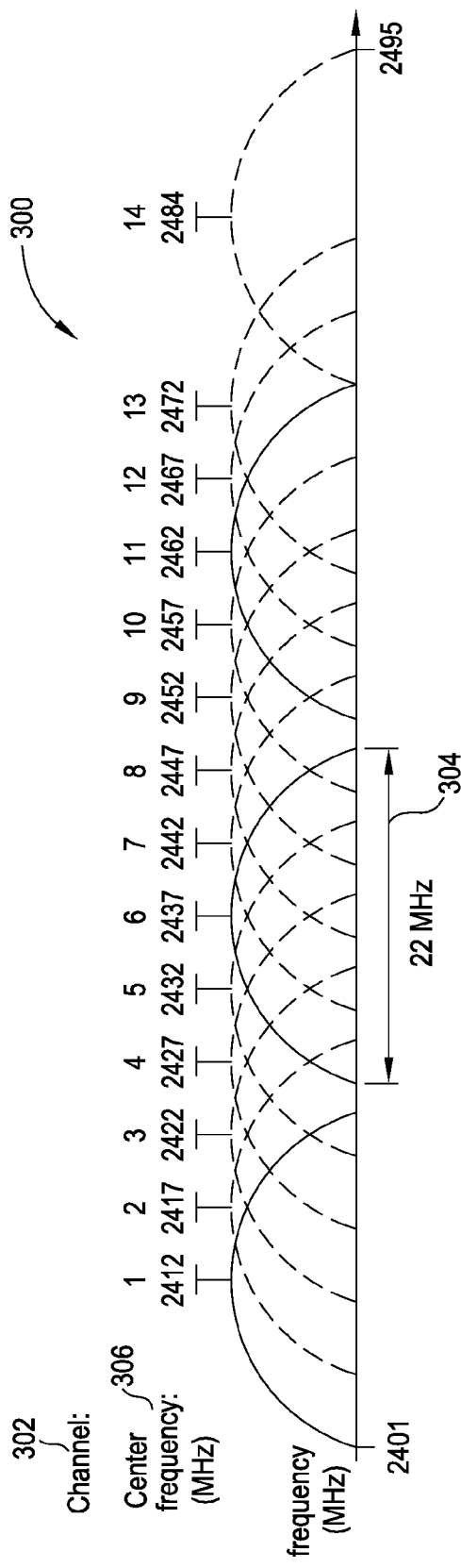
FIGS. 3A-3B illustrate different frequency bands via which the smart network of FIG. 1A is accessible, according to an example embodiment presented in this disclosure.
Figure 3B:
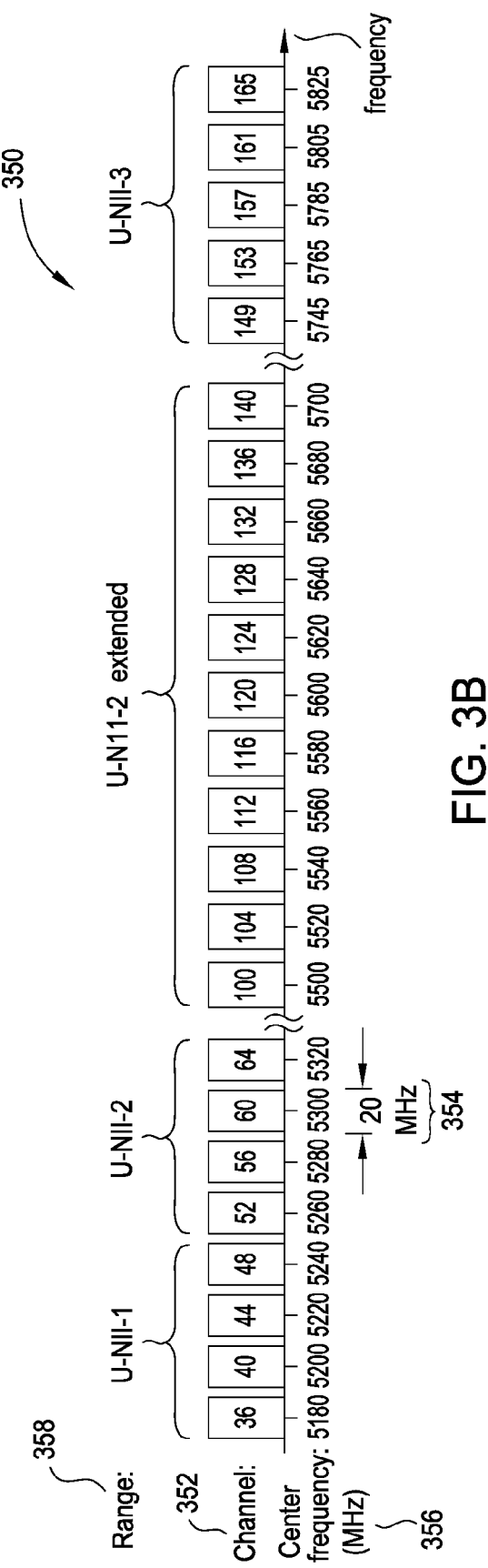

FIGS. 3A-3B illustrate the frequency bands 300, 350 via which the smart network 102 is accessible, according to an example embodiment. The frequency bands 300, 350 include a 2.4-gigahertz frequency band 300 and a 5-gigahertz frequency band 350. Each frequency band 300, 350 is divided into a respective plurality of channels 302, 352. Further, each channel 302, 352 has an associated frequency range 304, 354 and center frequency 306, 356. In particular, the 2.4-gigahertz frequency band 300 includes fourteen channels 302, each having a respective center frequency. The center frequencies of the fourteen channels 302 range from 2.412 to 2.484 gigahertz. The 5-gigahertz frequency band 350 includes twenty-four channels 352, each having a respective center frequency. The center frequencies of the twenty-four channels 352 range from 5.180 to 5.825 gigahertz.

In one embodiment, each channel in the 2.4-gigahertz frequency band 300 has a frequency range of twenty-two megahertz, and each channel in the 5-gigahertz frequency band 350 has a frequency range of twenty megahertz. The channels 352 of the 5-gigahertz frequency band 350 may also be classified into four Unlicensed National Information Infrastructure (U-NII) ranges 358 according to the IEEE standard 802.11. As shown, the U-NII ranges 358 include the U-NII-1 range, the U-NII-2 range, the U-NII-2 extended range, and the U-NII-3 range. The U-NII-1 range includes channels 35, 40, 44, and 48, which have center frequencies ranging from 5.180 to 5.240 gigahertz. The U-NII-2 range includes channels 52, 56, 60 and 64, which have center frequencies ranging from 5.260 to 5.320 gigahertz. The U-NII-2 extended range includes channels 100, 104, 108, 112, 116, 120, 124, 128, 132, 136 and 140, which have center frequencies ranging from 5.500 to 5.700 gigahertz. The U-NII-3 range includes channels 149, 153, 157, 161 and 165, which have center frequencies ranging from 5.745 to 5.825 gigahertz.

In some embodiments, the access points 141, 142 may be configured to exclude one or more of the channels 302, 352 from use. The channels may be excluded from use to comply with country-specific regulatory requirements. For example, the United States Federal Communications Commission (FCC) prohibits use of channel 14 and strictly limits use of channels 12 and 13 of the 2.4-gigahertz frequency band. Accordingly, the access points 141 may be configured to exclude channels 12-14 from use, in response to user input specifying United States as the country in which the access points 141 operate. Further, for an access point to operate in any channel in the U-NII-2 extended range, the FCC requires a number of conditions to be met, such as Dynamic Frequency Selection (DFS) support for radar avoidance. Accordingly, the access points 142 may exclude the channels in the U-NII-2 extended range from use, when the conditions are not met.

As described above, in one embodiment, the client device 130(1) may scan channels in the 5-gigahertz frequency band to select, from the access points 142, an access point with the highest signal strength. Depending on the embodiment, the client device 130(1) may scan using a given service set identifier (SSID) or scan to obtain all available SSIDs. Further, the access points 141, 142 may, but need not necessarily, have identical (or overlapping) SSID and/or security settings. In some embodiments, the client device 130(1) is configured to scan a reduced number of channels in the 5-gigahertz frequency band, to reduce the time delay incurred from scanning operations performed by the client device 130(1). The time delay may include a channel scan time, a channel change time, and/or a channel wait time. The channel scan time may be approximately ten milliseconds per channel if active scanning is used or one hundred milliseconds per channel if passive scanning is used. Both active scanning and passive scanning are further described below. The channel change time may be dependent on the vendor-specific implementation of the radio card in the station. The channel wait time may be incurred when a scanned channel is busy.

To scan a reduced number of channels in the 5-gigahertz frequency band, the client device 130(1) first scans the 2.4-gigahertz frequency band according to a predetermined scanning policy, which may be tailored to suit the needs of a particular case. In one embodiment, the predetermined scanning policy specifies to scan a first set of channels prior to scanning a second set of channels. The first set of channels includes the channels 1, 6 and 11, and the second set of channels includes the channels 2-5 and 7-10. The first set of channels is determined based on channels 1, 6 and 11 being the only instance of three non-overlapping channels in the 2.4-gigahertz frequency band. The second set of channels is formed from the remaining channels in the 2.4-gigahertz frequency band. Access points are often configured to operate in one of the first set of channels, to reduce wireless interference with other devices. Accordingly, by scanning based on the predetermined scanning policy, the client device 130(1) may more quickly identify the access point at least in some cases. Further, the 2.4-gigahertz frequency band has a smaller number of channels, relative to the 5-gigahertz frequency band. Accordingly, even when no access point is configured to operate in the first set of channels, the client device 130(1) may nevertheless scan the remaining channels in the 2.4-gigahertz frequency band. Consequently, the client device 130(1) may identify an access point in the 2.4-gigahertz frequency band relatively quickly, due to the smaller number of channels in the 2.4-gigahertz frequency band.

In one embodiment, in scanning the 2.4-gigahertz frequency band, the client device 130(1) performs active scanning and/or passive scanning. In active scanning, the client device 130(1) transmits a probe request frame on each channel. The probe request frame may specify a given SSID to trigger a probe response frame to be sent from access points within range, that are associated with the given SSID. Alternatively, the probe request frame may specify a broadcast SSID to trigger a probe response frame to be sent from all access points within range, regardless of the SSIDs associated with the access points. The client device 130(1) extracts information from each received probe response frame. The client device 130(1) may then use the extracted information to join the smart network 102 via the associated access point.

In passive scanning, the client device 130(1) sweeps from channel to channel, listening for beacon frames sent by any access point within range. During passive scanning, the client device 130(1) does not transmit any probe request frame. The client device 130(1) extracts information from each received beacon frame. The client device 130(1) may then use the extracted information to join the smart network 102 via the associated access point. A beacon frame is typically only sent periodically based on a predefined beacon interval. Accordingly, it may generally take less time to trigger and receive a probe response frame than to await a beacon frame. Consequently, active scanning may be more efficient than passive scanning at least in some cases. Thus, in some embodiments, the client device 130(1) is configured to use active scanning rather than passive scanning.

As described above, in one embodiment, the smart network 102 may be configured to minimize or at least reduce scanning performed by the client device 130(1) in the 5-gigahertz frequency band. To this end, each access point in the 2.4-gigahertz frequency band may be configured to provide a channel indicator to the client device 130(1), in response to scanning performed by the client device 130(1). The channel indicator specifies a channel in the 5-gigahertz frequency band, via which the smart network 102 is accessible. For example, the channel indicator may specify "channel 60" in the 5-gigahertz frequency band. In one embodiment, the smart network host device 120 configures the access points 142 to operate in the specified channel in the 5-gigahertz frequency band. In an alternative embodiment, the access points 142 are preconfigured to operate in the specified channel, and the smart network host device 120 obtains the specified channel from the access points 142. The smart network host device 120 may also transmit the specified channel to the access points 141 in the 2.4-gigahertz frequency band, to configure the access points 141 to provide the specified channel to the client device 130(1). The specified channel may be transmitted in a probe response frame or a beacon frame.

In one embodiment, the predetermined scanning policy also specifies that when scanning the 2.4-gigahertz frequency band, the client device 130(1) should identify a access point from which the client device 130(1) receives a message first-in-time. Identifying the first-in-time access point stands in contrast to identifying an access point with the highest signal strength, the latter access point being selected from all access points from which the client 130(1) receives a message. Identifying the first-in-time access point from the message may reduce delays associated with processing the message at least in some cases, because the client device 130(1) no longer needs to wait for messages from other access points in the 2.4-gigahertz frequency band.

In one embodiment, the received message may be a probe response frame or a beacon frame, depending on whether active scanning and/or passive scanning is used. Upon receiving the message, the client device 130(1) aborts scanning the 2.4-gigahertz frequency band. The client device 130(1) extracts the channel indicator from the message. The client device 130(1) then actively scans the 5-gigahertz frequency band in the specified channel. Actively scanning the channel includes generating a probe request frame based on the channel indicator, transmitting the probe request frame, and receiving one or more probe response frames. Based on the received probe response frames, the client device 130(1) selects an access point having the highest signal strength. The client device 130(1) may then send an association request to the selected access point, to join the smart network 102 via the selected access point. The association request may be generated based on information extracted from the probe response frame received from the selected access point.

By configuring the access points 142 to operate in the specified channel, the client device 130(1) may evaluate a group of access points 142 by scanning a single channel in the 5-gigahertz frequency band (namely, the specified channel). Accordingly, the client device 130(1) no longer incurs delays associated with switching channels and/or scanning other channels in the 5-gigahertz frequency band. Thus, the access point 142 having the highest signal strength may be selected more efficiently. Furthermore, the client device 130(1) is no longer required to re-scan for access points when roaming from one access point 142 to another. Instead, the client device 130(1) only scans the specified channel (e.g., channel 60 in the case of the previous example) in the 5-gigahertz frequency band. The client device 130(1) need not and does not scan other channels in the 5-gigahertz frequency band, e.g., channels 36, 40, 44, 48, 52, etc.

In alternative embodiments, the access points 142 are configured to operate in a predefined plurality of channels rather than in a single specified channel. In such embodiments, the channel indicator specifies the predefined plurality of channels, and the client device 130(1) scans only the predefined plurality of channels to the exclusion of any other channel in the 5-gigahertz frequency band. In such embodiments, the client device 130(1) may incur reduced delays associated with switching and/or scanning channels, relative to scanning all channels in the 5-gigahertz frequency band. Accordingly, the objectives of providing multiple channels and improving scanning efficiency may be balanced to suit the needs of a particular case.

Figure 4A:
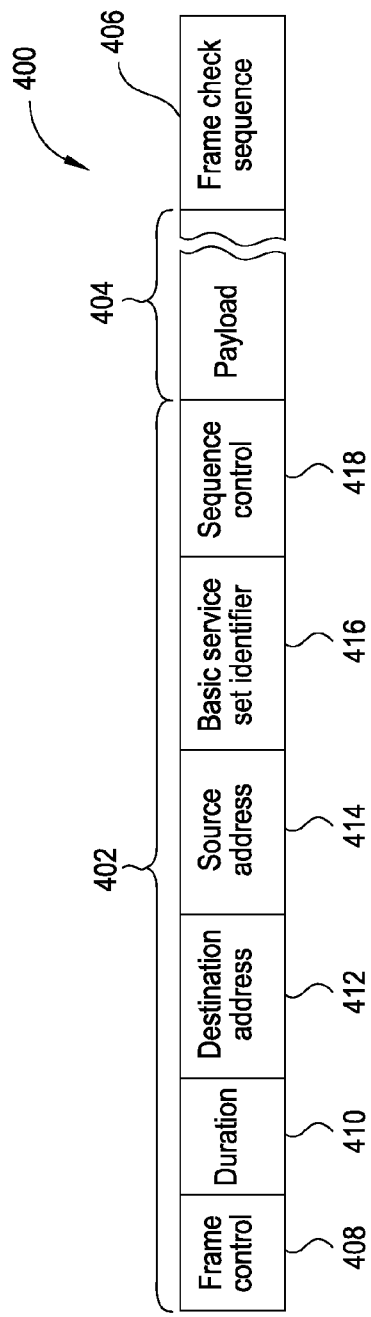
FIGS. 4A-4C illustrate a message structure for use in communication between a station and an access point, according to an example embodiment presented in this disclosure.
Figure 4B:
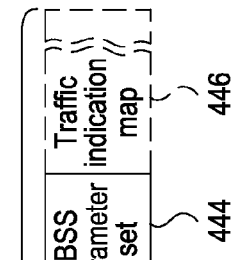
Figure 4C:
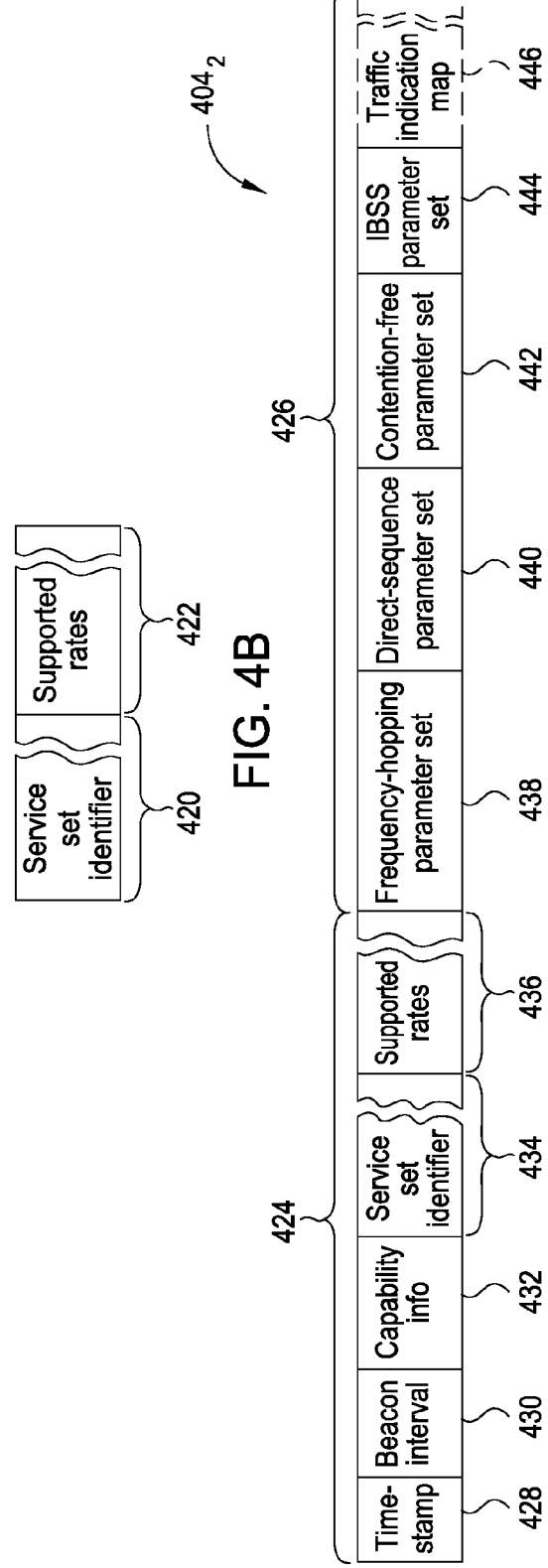

FIGS. 4A-4C illustrate a message structure 400 for the client device 130(1) and an access point 141, 142 to communicate with one another, according to an example embodiment. The message structure 400 may apply to probe request frames, probe response frames, and beacon frames. Further, the message structure 400 includes fixed fields and/or information elements. A fixed field refers to a field which length remains constant from message to message. An information element refers to a field which length may vary from message to message.

Depending on the embodiment, the channel indicator may be transmitted as an information element or a fixed field. In some embodiments, the message structure 400 may be altered to include additional fixed field(s) and/or information element(s) for transmitting the channel indicator and/or additional information associated with an access point operating in the 5-gigahertz frequency band. For example, the channel indicator may be stored in a Wireless Provisioning Services (WPS) information element, to facilitate scanning operations in conjunction with handshake operations under the WPS protocol. The additional information associated with the access point may include SSID, security settings, etc.

As shown in FIG. 4A, the message structure 400 includes a media access control (MAC) header 402, a payload 404, and a frame check sequence 406. The frame check sequence 406 is four bytes long and includes a checksum for error detection and/or correction. The checksum is calculated based on the MAC header 402 and the payload 404. The MAC header 402 includes a plurality of fixed fields. The fixed fields include a frame control 408, a duration 410, a destination address 412, a source address 414, a basic service set identifier (BSSID) 416 and a sequence control 418. The frame control 408 is two bytes long and identifies at least a protocol version, a frame type, and a frame subtype. Together, the frame type and the frame subtype specify the type of communication that is occurring between the client device 130(1) and the access point 141, 142. For example, a frame type of "00" and a frame subtype of "0100" indicate that the communication is a probe request frame. A frame type of "00" and a frame subtype of "0101" indicate that the communication is a probe response frame. A frame type of "00" and a frame subtype of "1000" indicate that the communication is a beacon frame.

In one embodiment, the duration 410 is two bytes long and specifies a length of time for which to reserve the wireless medium, to complete the current operation. The destination address 412 is six bytes long and identifies a final recipient of the frame. The source address 414 is six bytes long and identifies a source of the frame. The BSSID 416 is six bytes long and stores a MAC address of the wireless interface in the access point of an infrastructure network. The sequence control 418 is two bytes long and is used in defragmenting flames and/or discarding duplicate frames. The two bytes of the sequence control 418 may include a 12-bit sequence number and a 4-bit fragment number. The structure of the payload 404 may vary depending on whether the communication is a probe request frame, a probe response frame, or a beacon frame.

FIG. 4B shows the structure of the payload $404_1$ of a probe request frame. In this example, the payload $404_1$ includes an SSID 420 and supported rates 422. The SSID 420 is an information element specifying a network name for a given service set. Supported rates 422 is an information element specifying data rates supported by the network.

FIG. 4C shows the structure of the payload $404_2$ of a probe response frame and beacon frame. As shown, the payload $404_2$ includes mandatory fields 424. The payload $404_2$ may further include optional fields 426. The mandatory fields 424 include a timestamp 428, a beacon interval 430, capability info 432, an SSID 434, and supported rates 436. The optional fields 426 include a frequency-hopping (FH) parameter set 438, a direct-sequence (DS) parameter set 440, a contention-free (CF) parameter set, and an independent basic service set (IBSS) parameter set. For the beacon frame and not for the probe response frame, the optional fields 426 further include a traffic indication map 446.

In one embodiment, the timestamp 428 is eight bytes long and is incremented by the access point every microsecond. The timestamp 428 is used to synchronize operations of devices connected to the access point. The beacon interval 430 is two bytes long and specifies an expected duration before a next beacon frame is sent. The capability info 432 is two bytes long and specifies security operations supported by the access point. The SSID 434 is an information element specifying a network name for a given service set. Supported rates 436 is an information element specifying data rates supported by the network.

In one embodiment, the FH parameter set 438 is seven bytes long and is used when the physical layer involves frequency hopping operations. The DS parameter set 440 is two bytes long and is used when the physical layer involves direct-sequence operations. The CF parameter set 442 is eight bytes long and is used for access points that support contention-free operation. The IBSS parameter set is four bytes long and is used to indicate a period of IBSS beacon frames in an ad-hoc network. The traffic indication map indicates, to connected devices that are operating in power save mode, whether there is traffic queued for transmission for the connected devices.

FIG. 5 is a flowchart depicting a method 500 for channel scanning in a network having multiple wireless access points, according to an example embodiment. As shown, the method 500 begins at step 510, where the client device scans a first frequency band to identify a first access point. The first frequency band is divided into a first plurality of channels, and the first access point provides access to a network via a first channel of the first plurality of channels. For example, the first access point may provide access to the smart network 102 via channel 6 in the 2.4-gigahertz frequency band. At the step 510, the client device may perform active scanning and/or passive scanning.

At step 520, the client device receives a message from the first access point, the message specifying a second channel via which the network is accessible. The second channel is selected from a second plurality of channels of a second frequency band, different from the first frequency band. At least in some embodiments, the second frequency band does not overlap with the first frequency band. For instance, the client device may receive a beacon frame or probe response frame containing an information element specifying that the network is also accessible via channel 60 of the 5-gigahertz frequency band.

At step 530, the client device scans the specified second channel to identify an access point providing access to the network via the second frequency band. Depending on the embodiment, the access point identified at the step 530 may be the same as or different from the access point identified at the step 510. For instance, the client device may actively scan channel 60 of the 5-gigahertz frequency band to identify one or more access points operating in channel 60. At least in some embodiments, from the identified access points, the client device may select the access point having the highest signal strength. At step 540, the client device sends an association request to the selected access point, to join the network via the specified channel in the second frequency band. After the step 540, the method 500 terminates.

Embodiments described above provide techniques for channel scanning in a network having one or more access points. The wireless access points may provide connectivity to the network via multiple frequency bands, including a first frequency band and a second frequency band. A client device that desires wireless connectivity to the network via the second frequency band may scan the first frequency band to identify a first access point. The client device may receive a message from the first access point via the first frequency band, the message containing a channel indicator. The channel indicator specifies a channel in the second frequency band, via which the network is accessible. The client device scans the specified channel of the second frequency band to identify a second access point. Depending on the embodiment, the second access point may be the same access point as the first access point or a different access point than the first access point. The client device then sends an association request to the second access point, to join the network via the second frequency band. Advantageously, the client device need not incur delays associated with scanning channels in the second frequency band, i.e., delays incurred scanning channels not specified by the channel indicator. Accordingly, the client device may connect to the network via the second frequency band more efficiently and/or conveniently at least in some cases.

While the forgoing is directed to embodiments of the present disclosure, other and further embodiments of the disclosure may be devised without departing from the basic scope thereof. For example, aspects of the present disclosure may be implemented in hardware or software or in a combination of hardware and software. One embodiment of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present disclosure, are embodiments of the present disclosure.

In view of the foregoing, the scope of the present disclosure is determined by the claims that follow.

We claim:

1. A computer-implemented method of using different frequency bands to programmatically reduce a number of channels that are scanned in order to join a network, the method comprising:

scanning a first frequency band to identify a first wireless access point (WAP), wherein the first frequency band is divided into at least a first plurality of channels, and wherein the first WAP provides access to the network via a first channel of the first plurality of channels, wherein the first frequency band is scanned according to a scanning policy under which a specified set of channels in the first plurality of channels is scanned prior to scanning other channels in the first plurality of channels, wherein the specified set of channels includes at least two non-overlapping channels;

receiving a first message from the first WAP via the first channel, the first message specifying at least a second channel different from the first channel and via which the network is accessible, wherein the second channel is selected from a second plurality of channels more numerous than the first plurality of channels and of a second frequency band specified by the first message and different from the first frequency band;

responsive to the first message, scanning the specified second channel to identify a second WAP providing access to the network via the second frequency band, including receiving, from the second WAP, a second message containing a channel indicator matching the second channel; and generate, based on the second WAP identified by scanning the specified second channel, an association request that is sent to the second WAP in order to join the network via the second frequency band and without having to scan any other channel in the more numerous second plurality of channels of the second frequency band.

2. The computer-implemented method of claim 1, wherein the first frequency band and the second frequency band do not overlap, wherein the first frequency band comprises a 2.4-gigahertz frequency band, wherein the second frequency band comprises a 5-gigahertz frequency band, wherein the network has an associated network name for each frequency band, wherein each network name comprises a service set identifier (SSID), wherein the first WAP and the second WAP are the same WAP.

3. The computer-implemented method of claim 1, wherein connectivity to the network via the first channel of the first frequency band is provided by a first plurality of WAPs, wherein the first plurality of WAPs includes the first WAP, wherein the first plurality of WAPs is identified when scanning the first frequency band, and wherein the method further comprises:

determining a received signal strength indicator (RSSI) for each of the first plurality of WAPs; and selecting the first WAP from the first plurality of WAPs, based on the determined RSSIs for the first plurality of WAPs.

4. The computer-implemented method of claim 3, wherein the connectivity to the network via the second channel of the second frequency band is provided by a second plurality of WAPs, wherein the second plurality of WAPs includes the second WAP, wherein the second plurality of WAPs is identified when scanning the specified channel, and wherein the method further comprises:

determining a received signal strength indicator (RSSI) for each of the second plurality of WAPs; and selecting the second WAP from the second plurality of WAPs, based on the determined RSSIs for the second plurality of WAPs.

5. A non-transitory computer-readable medium having logic encoded thereon, the logic for execution and when executed operable to perform an operation of using different frequency bands to programmatically reduce a number of channels that are scanned in order to join a network, the operation comprising:

scan a first frequency band to identify a first wireless access point (WAP), wherein the first frequency band is divided into at least a first plurality of channels, and wherein the first WAP provides access to the network via a first channel of the first plurality of channels, wherein the first frequency band is scanned according to a scanning policy under which a specified set of channels in the first plurality of channels is scanned prior to scanning other channels in the first plurality of channels, wherein the specified set of channels includes at least two non-overlapping channels;

receive a first message from the first WAP via the first channel, the first message specifying at least a second channel different from the first channel and via which the network is accessible, wherein the second channel is selected from a second plurality of channels more numerous than the first plurality of channels and of a second frequency band specified by the first message and different from the first frequency band;

responsive to the first message, scan the specified second channel to identify a second WAP providing access to the network via the second frequency band, including receiving, from the second WAP, a second message containing a channel indicator matching the second channel; and generate, based on the second WAP identified by scanning the specified second channel, an association request that is sent to the second WAP in order to join the network via the second frequency band and without having to scan any other channel in the more numerous second plurality of channels of the second frequency band.

6. The non-transitory computer-readable medium of claim 5, wherein the first frequency band and the second frequency band do not overlap, wherein the first frequency band comprises a 2.4-gigahertz frequency band, wherein the second frequency band comprises a 5-gigahertz frequency band, wherein the network has an associated network name for each frequency band, and wherein each network name comprises a service set identifier (SSID), wherein the first WAP and the second WAP are the same WAP.

7. The non-transitory computer-readable medium of claim 5, wherein connectivity to the network via the first channel of the first frequency band is provided by a first plurality of WAPs, wherein the first plurality of WAPs includes the first WAP, wherein the first plurality of WAPs is identified when scanning the first frequency band, and wherein the logic is further operable to:

determine a received signal strength indicator (RSSI) for each of the first plurality of WAPs; and select the first WAP from the first plurality of WAPs, based on the determined RSSIs for the first plurality of WAPs.

8. The non-transitory computer-readable medium of claim 7, wherein the connectivity to the network via the second channel of the second frequency band is provided by a second plurality of WAPs, wherein the second plurality of WAPs includes the second WAP, wherein the second plurality of WAPs is identified when scanning the specified channel, and wherein the logic is further operable to:
  determine a received signal strength indicator (RSSI) for each of the second plurality of WAPs; and
  select the second WAP from the second plurality of WAPs, based on the determined RSSIs for the second plurality of WAPs.

9. A system of using different frequency bands to programmatically reduce a number of channels that are scanned in order to join a network, the system comprising:
  at least one computer processors;
  at least one wireless network interface operatively connected to the at least one computer processor;
  logic encoded in one or more tangible media for execution and, when executed by the at least one computer processors, operable to, in conjunction with the at least one wireless network interface:
    scan a first frequency band to identify a first wireless access point (WAP), wherein the first frequency band is divided into a first plurality of channels, and wherein the first WAP provides access to a network via a first channel of the first plurality of channels, wherein the first frequency band is scanned according to a scanning policy under which a specified set of channels in the first plurality of channels is scanned prior to scanning other channels in the first plurality of channels, wherein the specified set of channels includes at least two non-overlapping channels;
    receive a first message from the first WAP via the first channel, the first message specifying at least a second channel different from the first channel and via which the network is accessible, wherein the second channel is selected from a second plurality of channels more numerous than the first plurality of channels and of a second frequency band specified by the first message and different from the first frequency band;
    responsive to the first message, scan the specified second channel to identify a second WAP providing access to the network via the second frequency band, including receiving, from the second WAP, a second message containing a channel indicator matching the second channel; and
    generate, based on the second WAP identified by scanning the specified second channel, an association request that is sent to the second WAP in order to join the network via the second frequency band and without having to scan any other channel in the more numerous second plurality of channels of the second frequency band.

10. The system of claim 9, wherein the first frequency band and the second frequency band do not overlap, wherein the first frequency band comprises a 2.4-gigahertz frequency band, wherein the second frequency band comprises a 5-gigahertz frequency band, wherein the network has an associated network name for each frequency band, and wherein each network name comprises a service set identifier (SSID), wherein the first WAP and the second WAP are the same WAP.

11. The system of claim 9, wherein connectivity to the network via the first channel of the first frequency band is provided by a first plurality of WAPs, wherein the first plurality of WAPs includes the first WAP, wherein the first plurality of WAPs is identified when scanning the first frequency band, and wherein the logic is further operable to:
  determine a received signal strength indicator (RSSI) for each of the first plurality of WAPs; and
  select the first WAP from the first plurality of WAPs, based on the determined RSSIs for the first plurality of WAPs.

12. The system of claim 11, whereby scanning of any other channel in the more numerous second plurality of channels of the second frequency band is avoided by virtue of the first message received as a result of scanning the first frequency band, thereby using different frequency bands in order to programmatically reduce the number of channels that are scanned in order to join the network, wherein the second frequency band is divided into the second plurality of channels, wherein no channels in the second frequency band are scanned responsive to the first message, other than the specified second channel;
  wherein the first frequency band and the second frequency band do not overlap, wherein the first frequency band comprises a 2.4-gigahertz frequency band, wherein the second frequency band comprises a 5-gigahertz frequency band, wherein the network has an associated network name for each frequency band, wherein each network name comprises a service set identifier (SSID).

13. The system of claim 12, wherein the connectivity to the network via the second channel of the second frequency band is provided by a second plurality of WAPs, wherein the second plurality of WAPs includes the second WAP, wherein the second plurality of WAPs is identified when scanning the specified channel, wherein the method further comprises:
  determining a received signal strength indicator (RSSI) for each of the second plurality of WAPs; and
  selecting the second WAP from the second plurality of WAPs, based on the determined RSSIs for the second plurality of WAPs;
  wherein the first message comprises, in respective instances, of each message type selected from a beacon frame and a probe response frame, wherein a network name of the network is contained in the beacon frame or the probe response frame, wherein the association request comprises an association request frame.

14. The system of claim 13, wherein the first message consists of a media access control (MAC) header, a payload, and a frame check sequence;
  wherein the MAC header consists of a plurality of fixed fields consisting of a frame control, a duration, a destination address, a source address, a basic service set identifier (BSSID), and a sequence control, wherein the frame control is two bytes in length and identifies at least a protocol version, a frame type, and a frame subtype;
  wherein the duration is two bytes in length and specifies a length of time for which to reserve a wireless medium in order to complete a current operation, wherein the destination address is six bytes in length and identifies a final recipient of the first message, wherein the source address is six bytes in length and identifies a source of the first message, wherein the BSSID is six bytes in length and stores a MAC address of a wireless network interfaces in the first WAP, wherein the network is an infrastructure network.

15. The system of claim 14, wherein the sequence control is two bytes in length and consists of a twelve-bit sequence number and a four-bit fragment number, wherein the frame type and the frame subtype together specify a type of communication that is occurring between the system and the first WAP, the communication comprising the first message, wherein in respective instances: (i) the frame type of "00" and the frame sub-type of "0100" indicate that the first message is a probe request frame; (ii) the frame type of "00" and the frame subtype of "0101" indicate that the first message is a probe response frame; and (iii) the frame type of "00" and the frame subtype of "1000" indicate that the first message, wherein the probe response frame is only sent in reply to a corresponding probe request frame, wherein the beacon frame is sent independent of any probe request frame;
wherein the frame check sequence is four bytes in length and consists of a checksum for error detection, wherein the checksum is determined based on the MAC header and the payload.

16. The system of claim 15, wherein when the first message is a probe request frame, the payload consists of a service set identifier (SSID) and supported rates, wherein the SSID is an information element specifying a network name for a given service set, wherein support rates are an information element specifying a plurality of data rates supported by the network.

17. The system of claim 16, wherein when the first message is a probe response frame, the payload in one instance consists of a plurality of mandatory fields and a first plurality of optional fields, wherein the plurality of mandatory fields consists of a timestamp, a beacon interval, capability information, the SSID, and the supported rates, wherein the first plurality of optional fields consists of a frequency-hopping (FH) parameter set, a direct-sequence (DS) parameter set, a contention-free (CF) parameter set, and an independent basic service set (IBSS) parameter set, wherein the payload in another instance consists of the plurality of mandatory fields;
wherein the timestamp is eight bytes in length and is used to synchronize operations of a plurality of clients connected to the first WAP, the plurality of clients including the system, wherein the timestamp is incremented by the first WAP upon each elapsing of a predefined time interval, wherein the predefined time interval is one microsecond;
wherein the beacon interval is two bytes in length and specifies an expected duration before a subsequent beacon frame is sent, wherein the capability information is two bytes in length and specifies a plurality of security operations supported by the first WAP;
wherein when the first message is a beacon frame, the payload in one instance consists of the plurality of mandatory fields and a second plurality of optional fields, wherein the second plurality of optional fields consists of the first plurality of optional fields and a traffic indication map, wherein the payload in another instance consists of the plurality of mandatory fields.

\* \* \* \* \*